US012196376B2

(12) United States Patent
Ansems et al.

(10) Patent No.: US 12,196,376 B2
(45) Date of Patent: Jan. 14, 2025

(54) LIGHTGUIDE LAMP

(71) Applicant: SIGNIFY HOLDING B.V., Eindhoven (NL)

(72) Inventors: Johannes Petrus Maria Ansems, Hulsel (NL); Jan De Graaf, Uden (NL); Michal Jan Horaczek, Best (NL); Wessel Peter Deurwaarder, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/713,244

(22) PCT Filed: Nov. 21, 2022

(86) PCT No.: PCT/EP2022/082633

§ 371 (c)(1),
(2) Date: May 24, 2024

(87) PCT Pub. No.: WO2023/094324

PCT Pub. Date: Jun. 1, 2023

(65) Prior Publication Data

US 2024/0337355 A1 Oct. 10, 2024

(30) Foreign Application Priority Data

Nov. 25, 2021 (EP) .................................... 21210547

(51) Int. Cl.
*F21V 7/00* (2006.01)
*F21K 9/232* (2016.01)
(Continued)

(52) U.S. Cl.
CPC ................ *F21K 9/61* (2016.08); *F21K 9/232* (2016.08); *F21K 9/66* (2016.08); *F21K 9/68* (2016.08); *F21Y 2113/17* (2016.08)

(58) Field of Classification Search
CPC ... F21K 9/61; F21K 9/232; F21K 9/66; F21K 9/68; F21Y 2113/17
See application file for complete search history.

(56) References Cited

U.S. PATENT DOCUMENTS

2010/0148650 A1 6/2010 Wu et al.
2010/0208488 A1 8/2010 Luo
(Continued)

FOREIGN PATENT DOCUMENTS

CN 203797563 U 8/2014
CN 204922595 U 12/2015
(Continued)

*Primary Examiner* — Elmito Breval

(57) ABSTRACT

The invention provides a light generating system (1000) comprising one or more light generating devices (100), a lightguide element (500), a reflector (410), and optionally a light transmissive envelope (600), wherein: (A) the one or more light generating devices (100) are configured to generate device light (101); (B) the lightguide element (500) comprises a light transmissive body (510) comprising light transmissive material (502), which is light transmissive for the device light (101); wherein the light transmissive body (510) comprises an axis of elongation (501) and a body length (L1), wherein the light transmissive body (510) comprises a first end (511) and a second end (512); wherein the light transmissive body (510) comprises (i) a first outer face (521), comprised by the first end (511), (ii) a second outer face (522), comprised by the second end (512), and (iii) an external side face (523) bridging a distance between the first outer face (521) and the second outer face (521) and having a distance (d1) to the axis of elongation (501); wherein d1<L1; wherein a second outer face part (524) of the second outer face (522) is configured to provide a cavity (530) for hosting at least part of the reflector (410); (C) the reflector (410) is a diffuse reflector for the device light (101), wherein at least part of the reflector (410) is configured in at
(Continued)

least part of the cavity (530); (D) the one or more light generating devices (100), the lightguide element (500), and the reflector (410) are configured such that (i) at least part of the device light (101) is incoupled in the lightguide element (500) via the first outer face (521), (ii) at least part of the incoupled device light (101) escapes from the lightguide element (500) via the external side face (523) and via the second outer face (522), such as via the second outer face part (and/or the rim part), (iii) at least part of the device light (101) that propagated to the second outer face part (524) is reflected by the reflector (410); and (E) at least part of the lightguide element (500) is configured within the optional light transmissive envelope (600), wherein the light transmissive envelope (600) is transmissive for at least part of the device light (101).

15 Claims, 8 Drawing Sheets

(51) Int. Cl.

| | |
|---|---|
| ***F21K 9/61*** | (2016.01) |
| ***F21K 9/66*** | (2016.01) |
| ***F21K 9/68*** | (2016.01) |
| *F21Y 113/17* | (2016.01) |

(56) References Cited

U.S. PATENT DOCUMENTS

| | | | |
|---|---|---|---|
| 2011/0267836 | A1 | 11/2011 | Boonekamp et al. |
| 2011/0273900 | A1 | 11/2011 | Li et al. |
| 2012/0014111 | A1 | 1/2012 | Welten |
| 2012/0134171 | A1 | 5/2012 | Ye et al. |
| 2013/0083555 | A1 | 4/2013 | Chen et al. |
| 2014/0204606 | A1 | 7/2014 | Smits et al. |
| 2017/0211749 | A1 | 7/2017 | Ohno et al. |
| 2017/0268740 | A1 | 9/2017 | Boenigk |
| 2020/0192017 | A1 | 6/2020 | Dülk et al. |

FOREIGN PATENT DOCUMENTS

| | | | |
|---|---|---|---|
| CN | 204922849 | U | 12/2015 |
| EP | 3358246 | A1 | 8/2018 |
| EP | 3392550 | A1 | 10/2018 |
| JP | 2002352602 | A | 12/2002 |
| JP | 2014527258 | A | 10/2014 |
| JP | 2017147025 | A | 8/2017 |
| JP | 2019197700 | A | 11/2019 |
| TW | 201312042 | A | 3/2013 |
| WO | 2018010992 | A1 | 1/2018 |

LIGHTGUIDE LAMP

CROSS-REFERENCE TO PRIOR APPLICATIONS

This application is the U.S. National Phase application under 35 U.S.C. § 371 of International Application No. PCT/EP2022/082633, filed on Nov. 21, 2022, which claims the benefit of European Patent Application No. 21210547.2, filed on Nov. 25, 2021. These applications are hereby incorporated by reference herein.

FIELD OF THE INVENTION

The invention relates to a light generating system and to a lighting device comprising such system.

BACKGROUND OF THE INVENTION

Optical elements and light sources comprising such optical elements are known in the art. US2011/0273900, for instance, describes an optical element comprising: a light transmissive lightguide having an input end, an output end, and a central region therebetween, the lightguide extending along an axial direction; a light unit including at least one light emitting diode and arranged adjacent to the input end for injecting light into the central region; and a reflector being arranged adjacent to the output end such that at least a portion of light incident on the reflector is reflected; wherein: an index of refraction of the lightguide is higher than the index of refraction of a medium exterior to the lightguide; and at least a portion of the interior boundary surface of the lightguide includes a prismatic surface comprising a plurality of prisms arranged in a succession along the axial direction, each prism being arranged at an angle to the axial direction; wherein the reflector has a reflecting surface facing the output end and covering at least a portion of the output end, wherein the reflecting surface is arranged such that at least a portion of the reflecting surface is one of concave and convex.

SUMMARY OF THE INVENTION

There is a desire for alternative lighting devices that may especially be efficient and/or create desirable optical effects. Some of the known systems may be complicated to make and/or may not provide the desirable optical effects. Further, there is desire to provide lighting devices having a substantial Lambertian spatial power distribution. Hence, it is an aspect of the invention to provide an alternative light generating system and/or lighting device comprising such light generating system, which preferably further at least partly obviate(s) one or more of above-described drawbacks. The present invention may have as object to overcome or ameliorate at least one of the disadvantages of the prior art, or to provide a useful alternative.

According to a first aspect, the invention provides a light generating system ("system") comprising one or more light generating devices and a lightguide element. The light generating system may further optionally comprise reflector. Especially, the one or more light generating devices may be configured to generate device light. In specific embodiments, the one or more light generating devices may comprise diode based light sources. Further, especially the lightguide element comprises a light transmissive body comprising light transmissive material. The light transmissive material may especially be light transmissive for the device light. In embodiments, the light transmissive body may comprise an axis of elongation and a body length (L1), especially defined parallel to the axis of elongation. Further, the light transmissive body may comprise a first end and a second end. These ends may define the body length (L1). Especially, the light transmissive body may comprise (i) a first outer face, comprised by the first end, (ii) a second outer face, comprised by the second end, and (iii) an external side face bridging a distance between the first outer face and the second outer face. The external side face may have a distance (d1) to the axis of elongation. In embodiments, $d1<L1$. Especially, in embodiments the first outer face, the second outer face, and the external side face may define at least part of an external surface of the light transmissive body. In embodiments, a second outer face part of the second outer face may be configured to provide a cavity for hosting at least part of the reflector. Yet, in embodiments the reflector may especially be a diffuse reflector for the device light. Further, especially in embodiments at least part of the reflector may be configured in at least part of the cavity. In embodiments, the one or more light generating devices, the lightguide element, and the reflector may especially be configured such that at least part of the device light may be incoupled in the lightguide element via the first outer face, and at least part of the incoupled device light may escape from the lightguide element via the external side face and/or via the second outer face, such as via the second outer face part (and/or the rim part). In specific embodiments, the reflector may be configured such that part of the device light (that) propagated to the second outer face part may be reflected (by the reflector). Yet, in embodiments the one or more light generating devices, the lightguide element, and the reflector may especially be configured such that part of the device light (that) propagated to the second outer face (and escaped via the second outer face) may propagate away from the lightguide element in a direction having a component parallel to the axis of elongation. Further, in embodiments at least part of the device light propagated to the second outer face part may be reflected by the reflector. Yet, in embodiments especially in the range of 2-15% of the device light that escapes from the light generating system may escape within a (virtual) cone with the axis of elongation as cone axis, wherein the cone may have a cone angle ($\theta2$) selected from the range of 20-40°. Further, the system may in embodiments comprise a light transmissive envelope. Especially, in embodiments at least part of the lightguide element may be configured within the light transmissive envelope. Further, especially the light transmissive envelope may be transmissive for at least part of the device light. Especially, the invention provides in (specific) embodiments a light generating system comprising one or more light generating devices, a lightguide element, a reflector, and a light transmissive envelope, wherein: (A) the one or more light generating devices are configured to generate device light; wherein the one or more light generating devices comprise diode based light sources; (B) the lightguide element comprises a light transmissive body comprising light transmissive material, which is light transmissive for the device light; wherein the light transmissive body comprises an axis of elongation and a body length (L1) defined parallel to the axis of elongation, wherein the light transmissive body comprises a first end and a second end defining the body length (L1); wherein the light transmissive body comprises (i) a first outer face, comprised by the first end, (ii) a second outer face, comprised by the second end, and (iii) an external side face bridging a distance between the first outer face and the second outer face and having a (radial) distance (d1) to the axis of elongation; wherein d1<L1; wherein the first outer face, the second outer face, and the external side face define at least part of an external surface of the light transmissive body; wherein a second outer face part of the second outer face is configured to provide a cavity for hosting at least part of the reflector; (C) the reflector is a (diffuse) reflector for the device light, wherein at least part of the reflector is configured in at least part of the cavity; (D) the one or more light generating devices, the lightguide element, and the reflector are configured such that at least part of the device light is incoupled in the lightguide element via the first outer face, and wherein at least part of the incoupled device light escapes from the lightguide element via the external side face and via the second outer face, such as via the second outer face part (and/or the rim part), and wherein the reflector is configured such that part of the device light propagated to the second outer face is reflected and part of the device light propagated to the second outer face propagates away from the lightguide element in a direction having a component parallel to the axis of elongation; and (E) at least part of the lightguide element is configured within the light transmissive envelope, wherein the light transmissive envelope is transmissive for at least part of the device light. Yet, in embodiments the invention provides a light generating system comprising one or more light generating devices, a lightguide element, a reflector, and optionally a light transmissive envelope, wherein: (A) the one or more light generating devices are configured to generate device light; wherein the one or more light generating devices comprise diode based light sources; (B) the lightguide element comprises a light transmissive body comprising light transmissive material, which is light transmissive for the device light; wherein the light transmissive body comprises an axis of elongation and a body length (L1) defined parallel to the axis of elongation, wherein the light transmissive body comprises a first end and a second end defining the body length (L1); wherein the light transmissive body comprises (i) a first outer face, comprised by the first end, (ii) a second outer face, comprised by the second end, and (iii) an external side face bridging a distance between the first outer face and the second outer face and having a distance (d1) to the axis of elongation; wherein d1<L1; wherein the first outer face, the second outer face, and the external side face define at least part of an external surface of the light transmissive body; wherein a second outer face part of the second outer face is configured to provide a cavity for hosting at least part of the reflector; (C) the reflector is a diffuse reflector for the device light, wherein at least part of the reflector is configured in at least part of the cavity; (D) the one or more light generating devices, the lightguide element, and the reflector are configured such that (i) at least part of the device light is incoupled in the lightguide element via the first outer face, (ii) at least part of the incoupled device light escapes from the lightguide element via the external side face and via the second outer face, such as via the second outer face part (and/or the rim part), (iii) at least part of the device light propagated to the second outer face part is reflected by the reflector; and (E) optionally at least part of the lightguide element may be configured within the light transmissive envelope, wherein the light transmissive envelope is transmissive for at least part of the device light. Yet, in embodiments the one or more light generating devices, the lightguide element, and the reflector are configured such (iv) in the range of 2-15% of the device light that escapes from the light generating system escapes within a (virtual) cone with the axis of elongation as cone axis, wherein the cone has a cone angle (θ2) selected from the range of 20-40°.

With such light generating system may be provided that may escape both from the side and from the top. This may provide a desirable flame shape perception of the light. Further, with such light generating system light of different light sources may be combined and possible cross-talk may be minimized. Further, the spatial power distribution of the light that escapes from the lightguide element may be controlled by controlling the dimensions of the reflective element, including optional openings in the reflective element. The reflective element, which may especially be diffuse reflective, may promote color mixing of the device light. Further, optional roughness at the outer face may also promote color mixing of the device light. Yet, with such light generating system light may escape in directions having a component parallel to a body axis of the lightguide element and in directions having a component perpendicular to the body axis of the lightguide element. Even, a substantially Lambertian light distribution may be provided with (embodiments of) the light generating system. Further, with the present invention a hue lightguide lamp may be provided. For instance, the light generating system may be functionally coupled by a hue controller, or the control system as described herein may be a hue control system.

As indicated above, the light generating system may comprising one or more light generating devices and a lightguide element. Further, the system may comprise a reflector. Yet further, the system may comprise a light transmissive envelope.

Especially, the one or more light generating devices are configured to generate device light (during operation of the one or more light generating devices). The one or more light generating devices may each comprise one or more light sources. Hence, each light generating device may comprise one or more light sources, more especially one or more solid state light sources. Further, the light generating device may comprise optics. Light, i.e. light source light (from the one or more light sources), escaping from the one or more light sources may in embodiments be beam shaped via the optics. Device light may especially comprise the light source light. More especially, the device light may essentially consist of the (light source) light of the one or more light sources.

The term "light source" may in principle relate to any light source known in the art. It may be a conventional (tungsten) light bulb, a low pressure mercury lamp, a high pressure mercury lamp, a fluorescent lamp, a LED (light emissive diode). In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light source may be configured on the same substrate. In embodiments, a COB is a multi LED chip configured together as a single lighting module.

The light source may have a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . The term "light source" may also refer to an organic light-emitting diode (OLED), such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi-LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term "light source" herein may also refer to a light source comprising a solid state light source, such as an LED or a laser diode or a superluminescent diode.

The "term light source" may (thus) in embodiments also refer to a light source that is (also) based on conversion of light, such as a light source in combination with a luminescent converter material. Hence, the term "light source" may also refer to a combination of a LED with a luminescent material configured to convert at least part of the LED radiation, or to a combination of a (diode) laser with a luminescent material configured to convert at least part of the (diode) laser radiation.

In embodiments, the term "light source" may also refer to a combination of a light source, like a LED, and an optical filter, which may change the spectral power distribution of the light generated by the light source. Especially, the "term light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a diode laser, or a superluminescent diode.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" or "solid state material laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:$CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:$YCa_4O(BO_3)_3$ or Nd:YCOB, neodymium doped yttrium orthovanadate (Nd:$YVO_4$) laser, neodymium glass (Nd:glass) laser, neodymium YLF (Nd:YLF) solid-state laser, promethium 147 doped phosphate glass ($147Pm^{3+}$:glass) solid-state laser, ruby laser ($Al_2O_3$:$Cr^{3+}$), thulium YAG (Tm:YAG) laser, titanium sapphire (Ti:sapphire; $Al_2O_3$:$Ti^{3+}$) laser, trivalent uranium doped calcium fluoride (U:$CaF_2$) solid-state laser, Ytterbium doped glass laser (rod, plate/chip, and fiber), Ytterbium YAG (Yb:YAG) laser, $Yb_2O_3$ (glass or ceramics) laser, etc.

For instance, including second and third harmonic generation embodiments, the light source may comprise one or more of an F center laser, an yttrium orthovanadate (Nd:$YVO_4$) laser, a promethium 147 doped phosphate glass ($147Pm^{3+}$:glass), and a titanium sapphire (Ti:sapphire; $Al_2O_3$:$Ti^{3+}$) laser. For instance, considering second and third harmonic generation, such light sources may be used to generated blue light.

In embodiments, the terms "laser" or "solid state laser" or "solid state material laser" may refer to one or more of a semiconductor laser diodes, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a lightguide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The laser light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments$\leq 2°$ (FWHM), more especially$\leq 1°$ (FWHM), most especially$\leq 0.5°$ (FWHM). Hence, $\leq 2°$ (FWHM) may be considered (highly) collimated light source light. Optics may be used to provide (high) collimation (see also above).

The term "solid state material laser", and similar terms, may refer to a solid state laser like based on a crystalline or glass body dopes with ions, like transition metal ions and/or lanthanide ions, to a fiber laser, to a photonic crystal laser, to a semiconductor laser, such as e.g. a vertical cavity surface-emitting laser (VCSEL), etc.

The term "solid state light source", and similar terms, may especially refer to semiconductor light sources, such as a light emitting diode (LED), a diode laser, or a superluminescent diode.

One or more light generating devices (of the one or more light generating devices) may comprise a superluminescent diode. Hence, one or more of the light sources of the one or more of the light generating devices may comprise a superluminescent diode.

Superluminescent diodes are known in the art. A superluminescent diode may be indicated as a semiconductor device which may be able to emit low-coherence light of a broad spectrum like a LED, while having a brightness in the order of a laser diode.

US2020192017 indicates for instance that "With current technology, a single SLED is capable of emitting over a bandwidth of, for example, at most 50-70 nm in the 800-900 nm wavelength range with sufficient spectral flatness and sufficient output power. In the visible range used for display applications, i.e. in the 450-650 nm wavelength range, a single SLED is capable of emitting over bandwidth of at most 10-30 nm with current technology. Those emission bandwidths are too small for a display or projector application which requires red (640 nm), green (520 nm) and blue (450 nm), i.e. RGB, emission". Further, superluminescent diodes are amongst others described, in "Edge Emitting Laser Diodes and Superluminescent Diodes", Szymon Stanczyk, Anna Kafar, Dario Schiavon, Stephen Najda, Thomas Slight, Piotr Perlin, Book Editor(s): Fabrizio Roccaforte, Mike Leszczynski, First published: 3 Aug. 2020 https://doi.org/10.1002/9783527825264.ch9 in chapter 9.3 superluminescent diodes. This book, and especially chapter 9.3, are herein incorporated by reference. Amongst others, it is indicated therein that the superluminescent diode (SLD) is an emitter, which combines the features of laser diodes and light-emitting diodes. SLD emitters utilize the stimulated emission, which means that these devices operate at current densities similar to those of laser diodes. The main difference between LDs and SLDs is that in the latter case, the device waveguide may be designed in a special way preventing the formation of a standing wave and lasing. Still, the presence of the waveguide ensures the emission of a high-quality light beam with high spatial coherence of the light, but the light is characterized by low time coherence at the same time" and "Currently, the most successful designs of nitride SLD are bent, curved, or tilted waveguide geometries as well as tilted facet geometries, whereas in all cases, the front end of the waveguide meets the device facet in an inclined way, as shown in FIG. 9.10. The inclined waveguide suppresses the reflection of light from the facet to the waveguide by directing it outside to the lossy unpumped area of the device chip". Hence, an SLD may especially be a semiconductor light source, where the spontaneous emission light is amplified by stimulated emission in the active region of the device. Such emission is called "super luminescence". Superluminescent diodes combine the high power and brightness of laser diodes with the low coherence of conventional light-emitting diodes. The low (temporal) coherence of the source has advantages that the speckle is significantly reduced or not visible, and the spectral distribution of emission is much broader compared to laser diodes, which can be better suited for lighting applications. Especially, with varying electrical current, the spectral power distribution of the superluminescent diode may vary. In this way the spectral power distribution can be controlled, see e.g. also Abdullah A. Alatawi, et al., Optics Express Vol. 26, Issue 20, pp. 26355-26364, https://doi.org/10.1364/OE.26.026355.

One or more light generating devices (of the one or more light generating devices) may comprise a VCSEL. Hence, one or more of the light sources of the one or more of the light generating devices may comprise a VCSEL.

A vertical-cavity surface-emitting laser, or VCSEL, is known in the art and may especially be a type of semiconductor laser diode with laser beam emission perpendicular from the top surface, contrary to edge-emitting semiconductor lasers (also in-plane lasers) which emit from surfaces formed by cleaving the individual chip out of a wafer. VCSELs may be tunable in emission wavelength, as known in the art. For instance, Dupont et al., Applied Physics Letters 98 (16): 161105-161105-3, DOI: 10.1063/1.3569591, or Wendi Chang et al., Applied Physics Letters 105 (7): 073303, DOI: 10.1063/1.4893758, or Thor Ansbaek, IEEE Journal of Selected Topics in Quantum Electronics 19 (4): 1702306-1702306, DOI: 10.1109/JSTQE.2013.2257164, or C. J. Chang-Hasnain, IEEE Journal of Selected Topics in Quantum Electronics (Volume: 6, Issue: 6, November-December 2000), DOI: 10.1109/2944.902146, or Kögel et al., IEEE Sensors Journal, December 2007, volume 7, no. 11, pages 1483-1489, or Jayaraman, et al., Electron Lett. 2012 Jul. 5; 48 (14): 867-869, doi: 10.1049/el.2012.1552, all document herein incorporated by reference, describe emission wavelength tunable VCSELs. Especially, with varying electrical voltage, the spectral power distribution of the VCSEL may vary. Hence, the term "VCSEL" may thus especially refer herein to a tunable VCSEL, as known in the art. Such tunable VCSELs may be based on MEMS technology. Such (tunable) VCSEL may also be indicated as "MEMS VCSEL". Therefore, in embodiments the laser diode may comprise a vertical-cavity surface-emitting laser (VCSEL) that has single-mode light emission and a long coherence length. The wavelength sweep may be implemented using a micro-electro-mechanical system (MEMS) to change the length of the laser cavity by which a stable and rapid wavelength sweep results.

Hence, with a VCSEL different spectral power distributions may be generated. Especially, the VCSEL may be configured to generate (during operation of the VCSEL) laser light. Therefore, the (VCSEL) laser light may have a controllable spectral power distribution. To control the spectral power distribution the (VCSEL) laser light, a control system may be applied. The control system may be configured to control the spectral power distribution of the (VCSEL) laser light.

Therefore, the one or more light generating devices may especially comprise diode based light sources. In specific embodiments, the one or more light generating devices comprise one or more of a light emitting diode, a diode laser, and a superluminescent diode. Light emitting diodes may be useful for this application. Diode lasers may provide high intensity light sources. VCSEL and superluminescent diodes may be color tunable, which may be useful for (further) controlling one or more of color, correlated color temperature, and color rendering index. The term "light emitting diode" may also refer to a plurality of light emitting diodes. The term "diode laser" may also refer to a plurality of diode lasers. The term "superluminescent diode" may also refer to a plurality of superluminescent diodes.

In embodiments, the one or more light generating devices may comprise at least two different light generating devices, wherein the at least two different light generating devices may differ in that they are configured to generate device light having different spectral power distributions. Hence, in an operational mode of the at least two different light generating devices, they may generate device light having different spectral power distributions. For instance, the device light of the at least two different light generating devices may differ in one or more of color point, correlated color temperature, and color rendering index. Hence, in an operational mode of the at least two different light generating devices, they may generate device light having different color points.

In specific embodiments, colors, or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinate of the light in the CIE 1976 UCS (uniform chromaticity scale) diagram.

As indicated above, the lightguide element may comprise a light transmissive body comprising light transmissive material. Especially, the light transmissive material is light transmissive for the device light. Hence, at least part of the device light received by the lightguide element may be transmitted through the lightguide element. More especially, the light transmissive material may essentially be light transparent for the device light.

The light transmissive material may comprise one or more materials selected from the group consisting of a transmissive organic material, such as selected from the group consisting of PE (polyethylene), PP (polypropylene), PEN (polyethylene naphthalate), PC (polycarbonate), polyurethanes (PU), polymethylacrylate (PMA), polymethylmethacrylate (PMMA) (Plexiglas or Perspex), polymethacrylimide (PMI), polymethylmethacrylimide (PMMI), styrene acrylonitrile resin (SAN), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the light transmissive material may comprise an aromatic polyester, or a copolymer thereof, such as e.g. one or more of polycarbonate (PC), poly (methyl) methacrylate (P (M) MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN). Especially, the light transmissive material may comprise polyethylene terephthalate (PET). Hence, the light transmissive material is especially a polymeric light transmissive material.

However, in another embodiment the light transmissive material may comprise an inorganic material. Especially, the inorganic light transmissive material may be selected from the group consisting of glasses, (fused) quartz, transmissive ceramic materials, and silicones. Also hybrid materials, comprising both inorganic and organic parts may be applied. Especially, the light transmissive material comprises one or more of PMMA, transparent PC, or glass.

For instance, the light transmissive material may comprise a ceramic body, like a garnet type of material. In alterative embodiments, the light transmissive material may comprise an alumina material, such as an $Al_2O_3$ based material. In embodiments, the light transmissive material may comprise e.g. sapphire. Other materials may also be possible like one or more of $CaF_2$, MgO, $BaF_2$, $A_3B_5O_{12}$ garnet, ALON (aluminum oxynitride), $MgAl_2O_4$ and $MgF_2$.

Especially, the material has a light transmission in the range of 50-100%, especially in the range of 70-100%, for light having a wavelength selected from the visible wavelength range. Herein, the term "visible light" especially relates to light having a wavelength selected from the range of 380-780 nm.

The transmission (or light permeability) can be determined by providing light at a specific wavelength with a first intensity to the light transmissive material under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

In specific embodiments, a material may be considered transmissive when the transmission of the radiation at a wavelength or in a wavelength range, especially at a wavelength or in a wavelength range of radiation generated by a source of radiation as herein described, through a 1 mm thick layer of the material, especially even through a 5 mm thick layer of the material, under perpendicular irradiation with said radiation is at least about 20%, such as at least 40%, like at least 60%, such as especially at least 80%, such as at least about 85%, such as even at least about 90%.

The light transmissive material has light guiding or wave guiding properties. Hence, the light transmissive material is herein also indicated as waveguide material or lightguide material. The light transmissive material will in general have (some) transmission of one or more of (N) UV, visible and (N) IR radiation, such as in embodiments at least visible light, in a direction perpendicular to the length of the light transmissive material. Without the activator (dopant) such as trivalent cerium, the internal transmission in the visible might be close to 100%.

The transmission of the light transmissive material (as such) for one or more luminescence wavelengths may be at least 80%/cm, such as at least 90%/cm, even more especially at least 95%/cm, such as at least 98%/cm, such as at least 99%/cm. This implies that e.g. a 1 $cm^3$ cubic shaped piece of light transmissive material, under perpendicular irradiation of radiation having a selected luminescence wavelength (such as a wavelength corresponding to an emission maximum of the luminescence of the luminescent material of the light transmissive material), will have a transmission of at least 95%.

Herein, values for transmission especially refer to transmission without taking into account Fresnel losses at interfaces (with e.g. air). Hence, the term "transmission" especially refers to the internal transmission. The internal transmission may e.g. be determined by measuring the transmission of two or more bodies having a different width over which the transmission is measured. Then, based on such measurements the contribution of Fresnel reflection losses and (consequently) the internal transmission can be determined. Hence, especially, the values for transmission indicated herein, disregard Fresnel losses.

In embodiments, an anti-reflection coating may be applied to the luminescent body, such as to suppress Fresnel reflection losses (during the light incoupling process).

In addition to a high transmission for the wavelength(s) of interest, also the scattering for the wavelength(s) may especially be low. Hence, the mean free path for the wavelength of interest only taking into account scattering effects (thus not taking into account possible absorption (which should be low anyhow in view of the high transmission), may be at least 0.5 times the length of the body, such as at least the length of the body, like at least twice the length of the body. For instance, in embodiments the mean free path only taking into account scattering effects may be at least 5 mm, such as at least 10 mm. The wavelength of interest may especially be the wavelength at maximum emission of the luminescence of the luminescent material. The term "mean free path" is especially the average distance a ray will travel before experiencing a scattering event that will change its propagation direction.

In embodiments, the element comprising the light transmissive material may essentially consist of the light transmissive material. In specific embodiments, the element comprising the light transmissive material may be a light transparent element.

Especially, the light transmissive element, such as the light transparent element, may in embodiments have an absorption length and/or a scatter length of at least the length (or thickness) of the light transmissive element, such as at least twice the length of the light transmissive element. The absorption length may be defined as the length over which the intensity of the light along a propagation direction due to absorption drops with 1/*e*. Likewise, the scatter length may be defined as the length along a propagation direction along which light is lost due to scattering and drops thereby with a factor 1/*e*. Here, the length may thus especially refer to the distance between a primary face and a secondary face of the light transmissive element, with the light transmissive material configured between the primary face and the secondary face. The first outer face and the second outer face may be the primary face and the secondary face, respectively.

The light transmissive body may comprise an axis of elongation and a body length (L1) defined parallel to the axis of elongation. The body length may e.g. be selected from the range of 2-150 mm, especially at least about 5 mm, more especially at least about 10 mm. Hence, in specific embodiment the light transmissive body may have a body length selected from the range of about 10-150 mm, such as especially selected from the range of about 15-100 mm. instead of the term "axis of elongation" also the term "body axis" may be applied. Especially, the light transmissive body may be essentially symmetrical relative to the body axis.

In embodiments, the light transmissive body may have a substantially circular cross-section (perpendicular to the axis of elongation). Here, the term "substantially" is used, as, as described below, in some embodiments there may be a relatively small modulation of the external surface, which is relatively small compared to the diameter. Alternatively, the light transmissive body may have a substantially n-gonal cross-section (perpendicular to the axis of elongation), wherein n≥2. When n=2, the side faces may be curved, when n is 3 or larger, the side faces may be curved or (substantially) planar. Especially, when the light transmissive body has a substantially n-gonal cross-section (perpendicular to the axis of elongation), n≥6, more especially n≥8, such as even more especially n≥12, like yet even more especially n≥24. Especially, however, the light transmissive body may have a substantially circular cross-section (perpendicular to the axis of elongation).

Hence, in embodiments the light transmissive body may have a tubular shape or a cylindrical shape. Hence, the light transmissive body may be a tubular body or a (solid) cylindrical body. One end may be defined by the first outer face and another end may be defined by the second outer face, and an external surface may be defined by an external side face.

Especially, in embodiments the light transmissive body comprises a first end and a second end defining the body length (L1); wherein the light transmissive body comprises (i) a first outer face, comprised by the first end, (ii) a second outer face, comprised by the second end, and (iii) an external side face bridging a distance between the first outer face and the second outer face. The external side face may have a (radial) distance (d1) to the axis of elongation.

In general, the distance d1 may essentially be the same over the entire cross-section of a specific cross-section (perpendicular to the axis of elongation), except for a possible optional modulation (see also below). Further, in embodiments the distance d1 may essentially the same over the entire cross-section of substantially each cross-section (perpendicular to the axis of elongation) along the axis of elongation, except for a possible optional modulation (see also below).

However, it is not excluded that the light transmissive body has (some) tapering over at least part of the length of the light transmissive body. Hence, the light transmissive body may in embodiments e.g. have a conical shape or pyramidal shape. Especially, however, the light transmissive body has an essentially cylindrical shape.

Hence, d1 may especially refer to a radius. Therefore, the external side face may be at a distance d1 equal to the radius of the light transmissive body from the axis of elongation. As will be clear to a person skilled in the art, the distance d1 may be determined perpendicular to the axis of elongation. The axis of elongation may at least partly coincide with an optical axis of the light generating system.

Especially, the optical axis may be defined as an imaginary line that defines the path along which light propagates through a system starting from the light generating element, here especially the light source. Especially, the optical axis may coincide with the direction of the light with the highest radiant flux.

Especially, in embodiments d1<L1. For instance, 0.01*L1≤d1≤0.5*L1. However, other values may also be possible. Alternatively or additionally, in embodiments d1 may be selected from the range of 4-15 mm, such as selected from the range of about 6-10 mm. However, other values may also be possible.

Light transmissive bodies having a length selected from the range of 10-150 mm, and distances d1 (or in embodiments radii) selected from the range of about 4-15 mm, with d1<L1, especially d1≤0.5*L1, appear to provide good (simulation) results.

The lightguide element may comprise an external surface. Part of this external surface may receive at least part of the device light. This part may be or may be comprised by the first outer face. At a distance of about the length of the lightguide element, the second outer face may be configured. Part of the incoupled light may escape via the second outer face. In between the first outer face, the second outer face, the external side face. This may especially the outer face of e.g. a cylindrically shaped, or tubular shaped, or conically shaped lightguide element. Hence, the first outer face, the second outer face, and the external side face define at least part of an external surface of the light transmissive body. For instance, the external surface of the light transmissive body may essentially consist of the first outer face, the second outer face, and the external side face. In embodiments, the first outer face may essentially be planar. Further, in embodiments the second outer face may comprise two parts, with one part essentially parallel to the first outer face and one part configured slanted relative to the axis of elongation. The external side face may circumferentially circumfere (surround) the axis of elongation.

Especially, a second outer face part of the second outer face is configured to provide a cavity for hosting at least part of the reflector. Hence, the second outer face may comprise a (first) part that may be (substantially) perpendicular to the axis of elongation. This part is herein also indicated as rim part. The second outer face may comprise a (second) part, herein indicated as "second outer face part" that may be slanted relative to the axis of elongation. Incoupled device light may escape from the system via the first part, whereas the escape of the device light via the second outer face part may be limited, due to the presence of the reflector.

The rim part of the second outer face may be configured essentially parallel to the first outer face. Hence, part of the second outer face may be configured parallel to the first outer face. Due to the presence of the cavity (for the reflector), at least part of the second outer face may not be parallel to the first outer face.

The reflector may be specular reflector for the device light or a diffuse reflector for the device light. Especially, the reflector is a diffuse reflector for the device light. A diffuse reflector may facilitate color mixing of the device light. Further, a (diffuse) reflector may reduce direct view back into the one or more light generating devices (via the lightguide element). At least part of the device light that is reflected by the reflector may enter the lightguide element again. Thereby, it may have another chance to escape from the lightguide element. Amongst others, a diffuse reflector for the device light may in embodiments be a diffuse reflector would the device light irradiate the diffuse reflector perpendicular.

The reflector may optionally include one or more through holes (see further below).

Especially, at least part of the reflector may be configured in at least part of the cavity. Hence, at least part of the shape may have a reflector that may be essentially complementary to the cavity. Hence, the reflector and the cavity may be configured in a male-female configuration. Nevertheless, in embodiments it may be desirable to reduce optical contact between the reflector and the second outer face (see also below).

Hence, in operation the one or more light generating devices generate device light, of which at least part enters the lightguide element via the first outer face. The incoupled device light propagates through the lightguide element via total internal reflection. Part of the incoupled light, however, may escape therefrom via (i) the second outer face, such as via the second outer face part (and/or via the rim part) and/or also via (ii) the external side face, especially via both. Hence, in embodiments the one or more light generating devices, the lightguide element, and the reflector may be configured such that at least part of the device light is incoupled in the lightguide element via the first outer face, and at least part of the incoupled device light escapes from the lightguide element via the external side face and via the second outer face, such as via the second outer face part (and/or via the rim part).

The phrase "at least part of the incoupled device light escapes from the lightguide element via the external side face and via the second outer face", and similar phrases, may especially indicate that part of the device light within the lightguide element leaves the light guide element via the external side face and (another) part of the device light within the lightguide element leaves the light guide element via the second outer face.

Part of the device light escaping from the second outer face may leave the system in a direction having a component at parallel to the axis of elongation. For instance, the intensity (in Watts) defined by the full width half maximum may be within a (virtual) cone having a cone angle selected from the range of 45-175°. Especially, the beam of light escaping from the (entire) lightguide element may be relatively broad and the full width half maximum may within a (virtual) cone having a cone angle selected from the range of 45-175°. The cone axis may essentially coincide with the axis of elongation. Further, part of the device light escaping from the second outer face part may be reflected back into the lightguide element. Especially, the reflector may be configured such that part of the device light propagated to the second outer face part is reflected and part of the device light propagated to the second outer face propagates away from the lightguide element in a direction having a component parallel to the axis of elongation.

Especially, in embodiments in the range of 1-30%, more especially 2-15% of the device light that escapes from the light generating system escapes within a (virtual) cone with the axis of elongation as cone axis, wherein the cone has a cone angle (θ2) selected from the range of 20-40°. Hence, the cone may e.g. have a cone angle of about 30°, and within that cone, e.g. in the range of 2-15% of the device light that escapes from the light generating system is found. Here, the percentages refer to percentage in Watts, relative to the total spectral power in the visible wavelength range. The cone may thus have as cone axis an axis essentially coinciding with the axis of elongation, and the tapering may be in direction from the second end to the first end.

Hence, a Lambertian distribution of the device light (or of the system light comprising the device light) may be obtained. In specific embodiments, system light may escape from the system within a hemisphere, or even larger, with an axis of the hemisphere essentially coinciding with the axis of elongation, with essentially at any angle within the hemisphere intensity of the device light.

Therefore, the phrase "in the range of 2-15% of the device light that escapes from the light generating system escapes within a (virtual) cone with the axis of elongation as cone axis, wherein the cone has a cone angle (θ2) selected from the range of 20-40°" may also indicate that a substantial part may escape the system outside this cone (but in embodiments within a cone having a larger cone angle).

The lightguide element, or especially at least part thereof, more especially at least the second outer face part may be configured within a light transmissive envelope, such as a "bulb". Hence, at least part of the lightguide element is configured within the light transmissive envelope, wherein the light transmissive envelope is transmissive for at least part of the device light. The light transmissive envelope may comprise a light transmissive material, such as described above in relation to the lightguide element. Especially, the light transmissive envelope may be based on glass. The light transmissive envelope may have a retro shape, like former tungsten based lamps. Hence, in this respect the light generating system may be provided as retrofit lamp (see further also below). The light transmissive envelope may enclose a volume of at least twice the volume of the lightguide element, such at least three times the volume of the lightguide element, such as up to about 20 times the volume of the lightguide element. The light transmissive envelope may essentially have a spherical shape. In embodiments, the light transmissive envelope may have a general (A) shape, or a mushroom shape, or an elliptical (E) shape, or a sign(S) shape.

The light generating devices, the lightguide element, and the reflector may be configured such that of all device light that escapes from the light generating system at maximum about 40% escapes from the lightguide element via the second outer face and at minimum about 60% escapes from the lightguide element via the external side face. In embodiments, 5-30% of all device light that escapes from the light generating system escapes from the lightguide element via the second outer face, like up to about 25%. Alternatively or additionally, in embodiments 55-98%, more especially 65-90% of all device light that escapes from the light generating system escapes from the lightguide element via the external side face, and about 2-45%, more especially 10-35% of all device light that escapes from the light generating system escapes from the lightguide element via the second outer face. Here, the percentages refer to percentage in Watts, relative to the total spectral power in the visible wavelength range. Hence, most of the light may escape via the external side face and but part of the light may escape via the second outer face, especially a part of the second outer face essentially perpendicular to the axis of elongation. In this way, in embodiments a substantially Lambertian light distribution may be provided.

To facilitate outcoupling of the device light from the lightguide element it may be useful to provide a structure to the external side face and/or the second outer face. The structure may e.g. be a surface roughness. Surface roughness may reduce the chance on (total) internal reflection.

Hence, a surface roughness of the external side face may be chosen to couple part of the device light in the lightguide element out thereof. Hence, in embodiments at least part of the external side face may have a surface roughness for facilitating outcoupling of the device light from the light transmissive body via the external side face. In embodiments, the surface roughness may have an Ra value selected from the range of 0.16-0.64 μm. In embodiments, the surface roughness may have an RMS value selected from the range of 7.90-31.30. Yet, in more specific embodiments the surface roughness may have an Ra value selected from the range of 0.32-0.5 μm. In embodiments, the surface roughness may have an RMS value selected from the range of 15.8-24.5.

In embodiments, at least part of the external side face may comprise a repetitive structure. This structure may have a sawtooth shape, a triangular shape, a square shape, and a sine shape (sinusoid). Other shapes, however, may also be possible. The repetitive structure may be 1D or 2D. Should the repetitive structure be 1D, then the repetitive structures may be elongated and may be substantially parallel to the axis of elongation. The repetitive structure may have a period (p) and a distance ($d_{ct}$) between crest and trough (this distance may in embodiments be twice the amplitude), both individual selected from the range of 0.1-4 mm, such as 0.2-5 mm. The repetitive structure may facilitate color mixing.

The period (p) and the distance ($d_{ct}$) between crest and trough may each individually be substantially smaller than the (radial) distance d1. For instance, in embodiments $0.001 \leq p/d1 \leq 0.1$ and/or $0.001 \leq p/dc \leq 0.1$.

In specific embodiments, the surface roughness of the at least part of the external side face may be superimposed on the repetitive structure, such as a sinusoidal shape.

Note that the surface roughness of the at least part of the external side face may be evenly distributed may in other embodiments also have a gradient. For instance, the roughness (Ra and/or RMS) may be larger closer to the second outer face than to the first outer face. For instance, the difference in roughness may be change continuously or stepwise between a first roughness and a second roughness. The differences in roughness, if any, along the external side face may be in the order of at least a factor 2.

Hence, the lightguide element may essentially completely transparent, except for the external side face having a surface roughness, which makes the surface opaque, and except for at least part of the second outer face, especially the rim, which may also have a surface roughness, which makes this surface also opaque. The surface roughness may improve color mixing.

When a repetitive structure is applied, this may especially extend until the second outer face. It appears that the light distribution may be improved when this is the case. Hence, in specific embodiments an edge defined by the external side face and the second outer face may (also) comprise the repetitive structure shape. Yet, in further specific embodiments the edge defined by the external side face and the second outer face comprises the sinusoidal shape.

As indicated above, also the second outer face may have a surface roughness. This may facilitate outcoupling of the device light from the light transmissive body via the second outer face. Especially, a rim, which may be configured between the external side face and the cavity may comprise such surface roughness. Though a gradient in the surface roughness is not excluded, the surface roughness of at least part of the second outer face may in embodiments substantially evenly be distributed.

Therefore, in embodiments the at least part of the second outer face may have a surface roughness for facilitating outcoupling of the device light from the light transmissive body via the second outer face. In specific embodiments, the surface roughness (of the at least part of the second outer face) may have an Ra value selected from the range of 2.03-6.30 μm. In specific embodiments, the surface roughness (of the at least part of the second outer face) may have an RMS value selected from the range of 98.90-306.20. Yet even more especially, in embodiments the surface roughness (of the at least part of the second outer face) has an Ra value selected from the range of 3.15-5.10 μm. In specific embodiments, the surface roughness may have an RMS value selected from the range of 153.7-248.6.

As indicated above, the second outer face may comprise a (first) part that may be (substantially) perpendicular to the axis of elongation and a (second) part, herein indicated as “second outer face part”, that may be slanted relative to the axis of elongation. Especially the latter part may face the reflector. Hence, part of the second outer face may not be directed to the reflector and part thereof may be directed to the reflector. Device light that may escape from the system may thus (also) escape via the (first) part that may be (substantially) perpendicular to the axis of elongation.

As can be derived from the above, especially in embodiments the second outer face may comprise a rim part configured between the external side face and the cavity. Further, as indicated above, the rim part may have the surface roughness as defined above in relation to the second outer face. Yet, the second outer face may further comprise the second outer face part, which is configured to provide the cavity. Device light may both escape from the lightguide element via the rim part and/or via the second outer face part. Device light escaping via the rim part may leave the system. Device light escaping via the second outer face part may be reflected back (unless there is a through hole (or opening) in the reflector) into the lightguide element. This device light may e.g. escape from the lightguide element via the external side face.

In specific embodiments, the lightguide element comprises a rim part. In further specific embodiments, the lightguide element may not comprise a rim part, but the reflector may comprise one or more through holes, through which the device light may escape, thus without being reflected (back into the lightguide element). In specific embodiments, the lightguide element comprises a rim part and the reflector may comprise one or more through holes.

Hence, when the reflector comprises one or more through holes, device light propagated to the second outer face part may not be reflected at the through hole, but propagate further, and escape from the system. Therefore, in embodiments the reflector may be configured such that part of the device light propagated to the second outer face part is reflected and the reflector may be configured such that (another) part of the device light propagated to the second outer face part is not reflected by the reflector but may propagate further via a through hole in the reflector. Note that the through holes are optional.

Effectively, a substantial part of the second outer face may be blocked by the reflector. The part that is not blocked may be selected from the rim and parts upstream from an opening (or through hole) in the reflector. Hence, the reflector may be provide a face, especially a conical face that is entirely reflective or that may further include one or more through holes. Especially, in embodiments for (about) 3-33%, such as 5-25%, like in the range of 10-25%, of a surface area of the second outer face may apply that a normal to the second outer face does not intersect with a reflector face of the reflector. This 3-33% of the surface area may be defined by the rim part and surface of the second outer face (directly) upstream of an opening in the reflector.

As the second end is not fully block by a reflector, part of the system light may escape from the system substantially parallel to the axis of elongation. In this way, a (better) Lambertian light distribution may be obtained.

Hence, device light escaped from the system may have escaped from the lightguide element via the external side face and/or via one or more of (i) a rim part and (ii) the second outer face part when (directly) downstream thereof is a through hole in the reflector. In embodiments, the reflector may comprise a single through hole (intersected by the axis of elongation). Therefore, in embodiments one or more of the following may apply: (i) the reflector comprises one or more through holes, and (ii) the second outer face comprises a rim part configured between the external side face and the cavity. Especially, in embodiments the rim part may circumferentially surround the reflector. Further, especially the rim part may have the herein indicated surface roughness (such as especially the rim part having an Ra value selected from the range of 2.03-6.30 μm).

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

In embodiments, the rim part may circumferentially surround the reflector. In embodiments, the reflector may have a reflector radius $r_r$. In embodiments, especially wherein the system comprises the rim part, the reflector radius ($r_r$) may be smaller than the (radial) distance (d1). Hence, in embodiments $r_r<d1$. For instance, in embodiments $r_r \leq 0.99*d1$. In specific embodiments, $0.8*d1 \leq r_r \leq 0.99*d1$, more especially $0.85*d1 \leq r_r \leq 0.99*d1$, like even more especially $0.9*d1 \leq r_r \leq 0.98*d1$, such as $0.95*d1 \leq r_r \leq 0.98*d1$. In embodiments, the rim part may have an outer radius $r_{ro}$ essentially the same as the distance (d1). In embodiments, $r_{ro}=d1$. Further, in embodiments the rim part may have an inner radius $r_{ri}$. In specific embodiments, the inner radius $r_{ri}$ of the rim part may essentially be the same as the outer radius of the reflector. Hence, in embodiments $r_{ri} \approx r_r$. In embodiments, $0.9 \leq r_r/r_{ri} \leq 1.0$, more especially $0.95 \leq r_r/r_{ri} \leq 1.0$, like in embodiments about $0.98 \leq r_r/r_r \leq 1.0$. Therefore, in specific embodiments about $0.8*d1 \leq r_{ri} \leq 0.99*d1$, more especially about $0.85*d1 \leq r_{ri} \leq 0.99*d1$, like even more especially about $0.9*d1 \leq r_{ri} \leq 0.98*d1$, such as about $0.95*d1 \leq r_{ri} \leq 0.98*d1$.

In specific embodiments, the reflector may comprise one or more through holes. In embodiments, the reflector may comprise a single through hole in the center of the reflector. Alternatively, the reflector may comprise two or more through holes. Therefore, in embodiments a reflector element may be provided comprising a main reflective part, which may be an essentially continuous part, with one or more through holes therein. The percentage of the cross-sectional area(s) of the through hole(s) relative to the area defined by the reflective part and the cross-section areas of the through hole(s) may be in the range of 0-25%, such as in specific embodiments larger than 0% up to 25% (zero percent in fact indicates no through hole), like in the range of 2-25%.

The reflector may in embodiments be provided as reflective coating on the surface of the cavity. In alternative embodiments a body comprising the reflector may be configured in the cavity. In specific embodiments, the body may be a conical body with a reflective surface. As indicated above, in embodiments the reflector and the cavity may be configured in a male-female configuration. The reflector may in embodiments be a polymeric body, of which the part directed to the cavity has a diffuse reflective surface. For instance, a white polymeric body may be used as reflector, like a white polymeric body having a cone shape. Hence, the reflector may have a conical shape.

In specific embodiments, the cavity (reflector cavity) may have a reflector directed cavity face, wherein at least part of the cavity face is not in optical contact with the reflector. Especially, the second outer face part may comprise the cavity face. In other embodiments, the second outer face part may essentially consist of the cavity face. As indicated above, the cavity face may be slanted. The slant angle may be selected from the range of 20-70°, like selected from the range of about 27.5-42.5°.

In specific embodiments, the reflector may have a cone angle (a) selected from the range of 40-140°, even more especially selected from the range of about 55-85°. Even more especially, the cone angle may be selected from the range of 70-75°, such as about 72.5°. Simulation results showed that such angles provide the best results in terms of outcoupling and spatial power distribution. As indicated above, the cavity may also have a cone shape, allowing the reflector and cavity to form an essentially male-female configuration. Especially, the reflector and the reflector cavity may have substantially corresponding shapes.

When elements are in optical contact or optically coupled, they may in embodiments be in physical contact with each other or may in other embodiments be separated from each other with e.g. a (thin) layer of optical material, such as an optical glue, or other optically transparent interface material, e.g. having a thickness of less than about 1 mm, preferably less than 100 μm. When no optically transparent interface material is applied, the (average) distance between two elements being in optical contact may especially be about at maximum the wavelength of relevance, such as the wavelength of an emission maximum. For visible wavelengths, this may be less than 1 μm, such as less than 0.7 μm, and for blue even smaller. Hence, when optical coupling is desired, an optically transparent interface material may be applied. In yet other embodiments, when no optically transparent interface material is applied, the average distance between two elements being in optical contact may especially be about at maximum the wavelength of relevance, such as the wavelength of an emission maximum. Hence, when optical contact is desired, there may be physical contact.

For instance, the reflector may be physically coupled to part of the rim, which allows less or no (physical) contact with the cavity. Alternatively or additionally, the reflector may only partly be in physical contact with the cavity. For instance, less than 50%, like in the range of less than 10% of the surface of the cavity may be in physical contact with the reflector, yet even more especially less than about 1%. For instance, the reflector may have an uneven surface and/or may include distance holders. In specific embodiments, less than 50%, like in the range of less than 10% of the surface of the cavity may be in optical contact with the reflector, yet even more especially less than about 1%.

At least part of the device light entered into the lightguide element via first outer face may propagate, optionally via one or more (internal) reflections, to the second outer face. Part of the device light reaching the second outer face may escape therefrom (especially from a rim part (if available)). This device light may especially be comprised by the system light, like also the device light escaped from the external side face may be. Part of the device light reaching the second outer face may also be reflected at the second outer face, dependent upon the angle with the second outer face. Part of the device light reaching the second outer face may also be reflected at the reflector. At least part of the light reflected at the reflector may be coupled (back) into the lightguide element via the second outer face (such as especially the second outer face part). When the reflector is not in optical contact with the second outer face, more especially the second outer face part, device light may escape from the lightguide element via the second outer face part, be reflected at the reflector, and thereby propagate back to the second outer face part, and enter the lightguide element again.

Hence, at least part of the device light entered into the lightguide element via first outer face may propagate, optionally via one or more (internal) reflections, to the second outer face and escape via the second outer face from the lightguide element. Alternatively, but especially additionally, at least part of the device light entered into the lightguide element via first outer face may propagate, optionally via one or more (internal) reflections, to the external side face and escape via the second outer face from the lightguide element. As can be derived from the above, in embodiments the light transmissive body may have a cylindrical shape. Especially the (radial) distance (d1) may be selected from the range of 6-10 mm. Further, the reflector may have a conical shape with a cone tip directing to the first end.

Hence, in specific embodiments the reflector may be configured to reflect part of the device light propagated to the second outer face part back into the lightguide element.

In embodiments, the light generating system may comprise a support, like a PCB. In embodiments, the support may be configured to support the one or more light generating devices. Further, the light generating system may comprise a lightguide element assembly ("assembly"). In embodiments, the lightguide assembly may comprises the lightguide element and a lightguide element base. The latter may be functionally coupled to the lightguide element. Especially, the lightguide element and a lightguide element base may be a monolithic body, and may e.g. be provided by casting, injection molding, or 3D printing a light transmissive polymeric material. Surface roughness may be provided after casting or 3D printing. Especially, the assembly may be provided by injection molding. The lightguide element base may comprises a base cavity. The one or more light generating devices may at least partly configured in the base cavity. Hence, a cavity may be defined by the lightguide assembly and the support. Especially, the lightguide element may be functionally coupled to the support via the lightguide element base. This coupling may be a physical coupling, e.g. with clamping elements. Hence, especially the light generating system may in embodiments comprise a support, wherein the support is configured to support the one or more light generating devices; wherein the light generating system further comprises a lightguide element assembly, wherein the lightguide assembly comprises the lightguide element and a lightguide element base functionally coupled to the lightguide element, wherein the lightguide element base comprises a base cavity, wherein the one or more light generating devices are at least partly configured in the base cavity, wherein the lightguide element is functionally coupled to the support via the lightguide element base.

As indicated above, the light generating system may further comprise a light transmissive envelope (see also above). The light transmissive envelope may have an envelope center, wherein the second end (of the lightguide element) may be closer to the envelope center than the first end, and wherein determined from the first end, a second distance (d2) from the second end to the envelope center may be selected from the range of about-20 mm to +25 mm, more especially selected from the range of −10 mm to +15 mm. Yet even more especially, a second distance (d2) from the second end to the envelope center may be selected from the range of about +1 mm to +10 mm, such as more especially selected from the range of +2 mm to +8 mm, such as at about +5 mm.

The lamp may have lamp base to which the lightguide element and/or the envelope may be functionally coupled. The lamp base may comprise electronics, like a driver. The lamp base may also comprise one or more electoral connectors for a functional coupling to a source of electoral power. For instance, the lamp base may comprise a screw base. The outer shape of at least part of the light generating system may therefore essentially be defined by the lamp base and the envelope.

Seen from the lamp base, any distance between the envelope center and the lamp base may be indicated with negative values. Hence, a value of −10 mm means that seen, from the lamp base, the envelope center is 10 mm further away from the lamp base than the second end. A value of 0 mm means that second end is essentially at the envelope center. However, a value of +15 mm means that seen, from the lamp base, the envelope center is 15 mm closer to the lamp base than the second end; the second end extends 15 mm from the envelope center. The envelope center may be a geometric center of the envelope.

Herein, the term "functionally coupled" may in embodiments refer to a physical connection or mechanical connection between at least two elements, such as via one or more of a screw, a solder, an adhesive, a melt connection, a click connection, etc. The terms "physical connection" and "mechanical connection" may herein interchangeably be used. The terms "physical connection" and "mechanical connection" may thus also refer to an adhesive connection. Alternatively or additionally, the term "functionally coupled" may in embodiments refer to an electrical conductive connection between at least two connections. When two (or more) elements have an electrically conductive connection, then there may be a conductivity (at room temperature) between the two (or more) elements of at least 1.105 S/m, such as at least 1.106 S/m. In general, an electrically conductive connection will be between two (or more) elements each comprising an electrically conductive material, which may be in physical contact with each other or between which an electrically conductive material is configured. Herein a conductivity of an insulated material may especially be equal to or smaller than 1.10-10 S/m, especially equal to or smaller than 1.10-13 S/m. Herein a ratio of an electrical conductivity of an isolating material (insulator) and an electrical conductivity of an electrically conductive material (conductor) may especially be selected smaller than 1.10-15. In specific embodiments, a functional coupling may also comprise a coupling via wireless communication, such a via Wi-Fi or Bluetooth or LiFi, etc.

Especially, the light generating devices may comprise one or more devices allowing the spectral power distribution of the device light be controlled. For instance the color point of the device may be controllable and/or the color rendering index may be controllable and/or the correlated color temperature may be controllable. In this way, the spectral power distribution of the light that escapes from the system, i.e. the system light, may be controllable. In specific embodiments, the one or more light generating devices comprise one or more of RGB light sources, RGBW light sources, and RYB light sources. Here, R represents red, G represents green, B represents blue, W represents white, and Y represents yellow.

In embodiments, the one or more light generating devices comprise at least two different types of white emitting light generating devices, such as configured to generate warm white light and cool white light, respectively, such as one or more light generating devices configured to generate device light having a CCT of at maximum 2700 K and one or more light generating device configured to generate device light having a CCT of at least 4500 K, such as at least about 5500 K. Beyond that, the one or more light generating devices may comprise one or more red light generating devices, one or more green light generating devices, and one or more blue light generating devices. Especially, the one or more light generating devices comprises one or more warm white light generating devices (especially CCT of at maximum 2700 K), one or more cool white light generating devices (especially CCT of at least 4500 K), one or more red light generating devices, one or more green light generating devices, and one or more blue light generating devices.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm. The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range.

The terms "visible", "visible light" or "visible emission" and similar terms refer to light having one or more wavelengths in the range of about 380-780 nm. Herein, UV may especially refer to a wavelength selected from the range of 190-380 nm, such as 200-380 nm.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

Therefore, in embodiments, the system may further comprise a control system configured to control a spectral power distribution of the device light.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. . . . Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions from a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode.

Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In specific embodiments, the light generating system may be configured to generate white system light comprising at least part of the device light escaped from the lightguide element via the external side face and via the second outer face, such as via the second outer face part when the reflector has one or more through holes and/or via the rim part). Especially, the system light may have one or more of a controllable color rendering index and a controllable correlated color temperature. In other embodiments, the system may be configured to generate colored light. hence, the system may be operated in different operational modes, e.g. one or more with (different types of) white light, and one or more with (different types of) colored light.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc. etc. . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein.

Hence, in an aspect the invention also provides a lighting device selected from the group of a lamp, a luminaire, a projector device, a disinfection device, a photochemical reactor, and an optical wireless communication device, comprising the light generating system as defined herein. The lighting device may comprise a housing or a carrier, configured to house or support, one or more elements of the light generating system. For instance, in embodiments the lighting device may comprise a housing or a carrier, configured to house or support one or more of the lightguide element and the one or more light generating devices. In specific embodiments, the lighting device may have the shape of a retrofit lamp.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light.

Hence, amongst others the invention provides a light generating system comprising one or more light generating devices, a lightguide element, a reflector, and optionally a light transmissive envelope, wherein: (A) the one or more light generating devices are configured to generate device light; (B) the lightguide element comprises a light transmissive body comprising light transmissive material, which is light transmissive for the device light; wherein the light transmissive body comprises an axis of elongation and a body length (L1), wherein the light transmissive body comprises a first end and a second end; wherein the light transmissive body comprises (i) a first outer face, comprised by the first end, (ii) a second outer face, comprised by the second end, and (iii) an external side face bridging a distance between the first outer face and the second outer face and having a distance (d1) to the axis of elongation; wherein $d1<L1$; wherein a second outer face part of the second outer face is configured to provide a cavity for hosting at least part of the reflector; (C) the reflector is a diffuse reflector for the device light, wherein at least part of the reflector is configured in at least part of the cavity; (D) the one or more light generating devices, the lightguide element, and the reflector are configured such that (i) at least part of the device light is incoupled in the lightguide element via the first outer face, (ii) at least part of the incoupled device light escapes from the lightguide element via the external side face and via the second outer face, such as via the second outer face part (and/or the rim part), (iii) at least part of the device light propagated to the second outer face part is reflected by the reflector; and (E) at least part of the lightguide element is configured within the optional light transmissive envelope, wherein the light transmissive envelope is transmissive for at least part of the device light.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
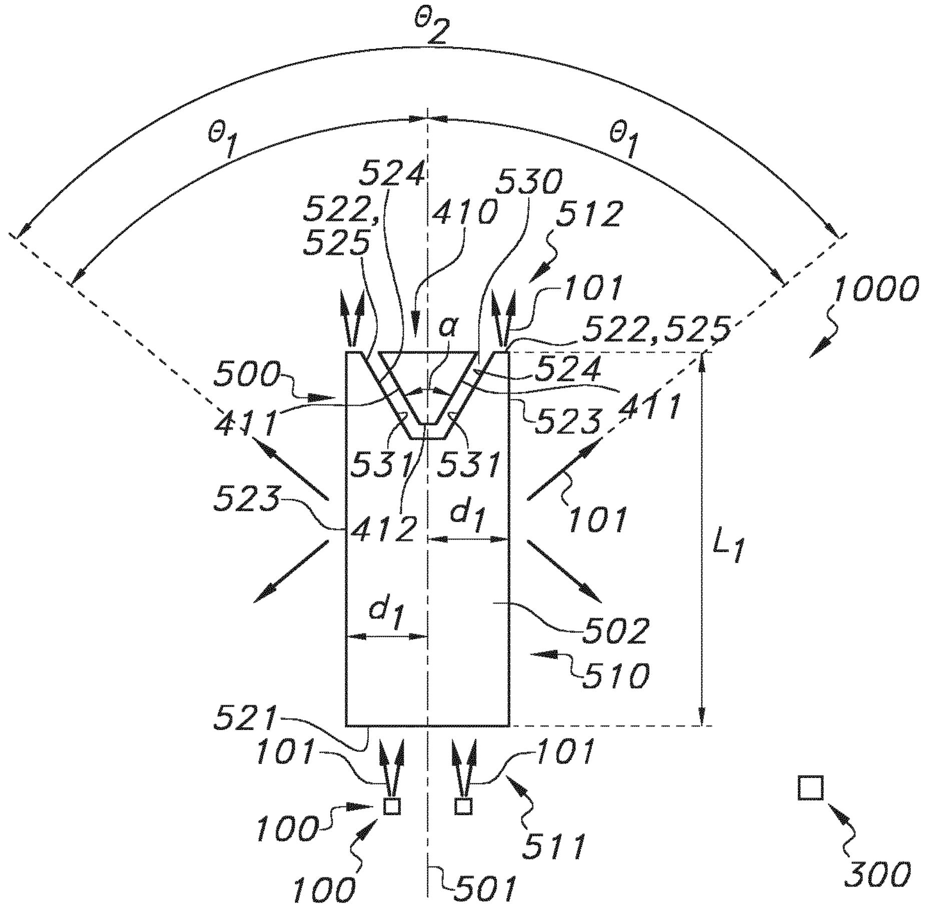
FIGS. 1A-1J schematically depict embodiments and aspects of the system 1000.

Referring to FIGS. 1A-1J embodiments and aspects of the system 1000 are depicted. Amongst others, FIG. 1A schematically depicts an embodiment of a light generating system 1000 comprising one or more light generating devices 100, a lightguide element 500, and a reflector 410.

The one or more light generating devices 100 may be configured to generate device light 101; wherein the one or more light generating devices 100 comprise diode based light sources.

The lightguide element 500 may comprise a light transmissive body 510 comprising light transmissive material 502, which may be light transmissive for the device light 101. The light transmissive body 510 may comprise an axis of elongation 501 and a body length L1 defined parallel to the axis of elongation 501. The light transmissive body 510 may comprise a first end 511 and a second end 512 defining the body length L1. The light transmissive body 510 may comprise (i) a first outer face 521, comprised by the first end 511, (ii) a second outer face 522, comprised by the second end 512, and (iii) an external side face 523 bridging a distance between the first outer face 521 and the second outer face 521 and having a (radial) distance d1 to the axis of elongation 501. Hence, d1 may refer to a radius in embodiments. Especially, $d1<L1$. The first outer face 521, the second outer face 522, and the external side face 523 may define at least part of an external surface of the light transmissive body 510. In embodiments, a second outer face part 524 of the second outer face 522 may be configured to provide a cavity 530 for hosting at least part of the reflector 410.

The reflector 410 may be a diffuse reflector for the device light 101. Especially, at least part of the reflector 410 may be configured in at least part of the cavity 530.

The one or more light generating devices 100, the lightguide element 500, and the reflector 410 may be configured such that at least part of the device light 101 may be incoupled in the lightguide element 500 via the first outer face 521, and at least part of the incoupled device light 101 may escape from the lightguide element 500 via the external side face 523 and/or via the second outer face part 524, especially via both. In embodiments, the reflector 410 may be configured such that part of the device light 101 propagated to the second outer face part 524 may be reflected and part of the device light 101 propagated to the second outer face part 524 propagates away from the lightguide element 500 in a direction having a component parallel to the axis of elongation 501.

In embodiments, at least part of the device light 101 propagated to the second outer face part 524 may be reflected by the reflector 410. In embodiments especially in the range of 2-15% of the device light 101 that escapes from the light generating system 1000 may escape within a (virtual) cone with the axis of elongation 501 as cone axis, wherein the cone may have a cone angle θ2 selected from the range of 20-40°. For instance, in the range of 2-15% of the device light 101 that escapes from the light generating system 1000 may escape within a (virtual) cone with the axis of elongation 501 as cone axis, wherein the cone may have a cone angle θ2 of 30°. Reference θ1 may be the half cone angle.

In embodiments, the at least part of the external side face 523 has a surface roughness for facilitating outcoupling of the device light 101 from the light transmissive body 510 via the external side face 523. Especially, in embodiments the surface roughness may have an Ra value selected from the range of 0.16-0.64 μm, more especially 0.32-0.5 μm, and/or an RMS value selected from the range of 7.90-31.30, more especially 15.8-24.5.

Figure 1B:
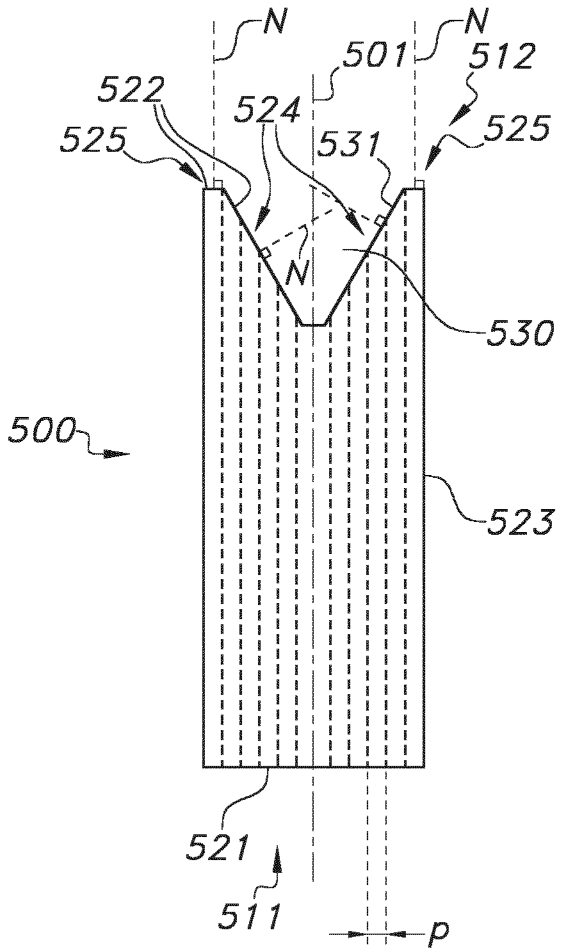
Figure 1C:
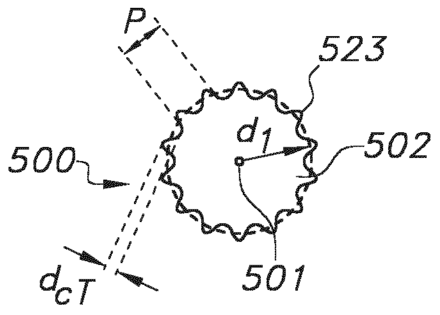

Amongst others referring to FIGS. 1B and 1C, in specific embodiments, at least part of the external side face 523 may be provided with a sinusoidal shape. Especially, in embodiments an edge 527 defined by the external side face 523 and the second outer face 522 may comprise the sinusoidal shape.

Figure 1D:
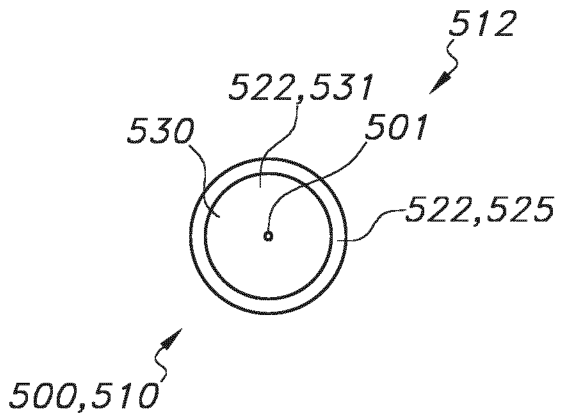
Figure 1E:
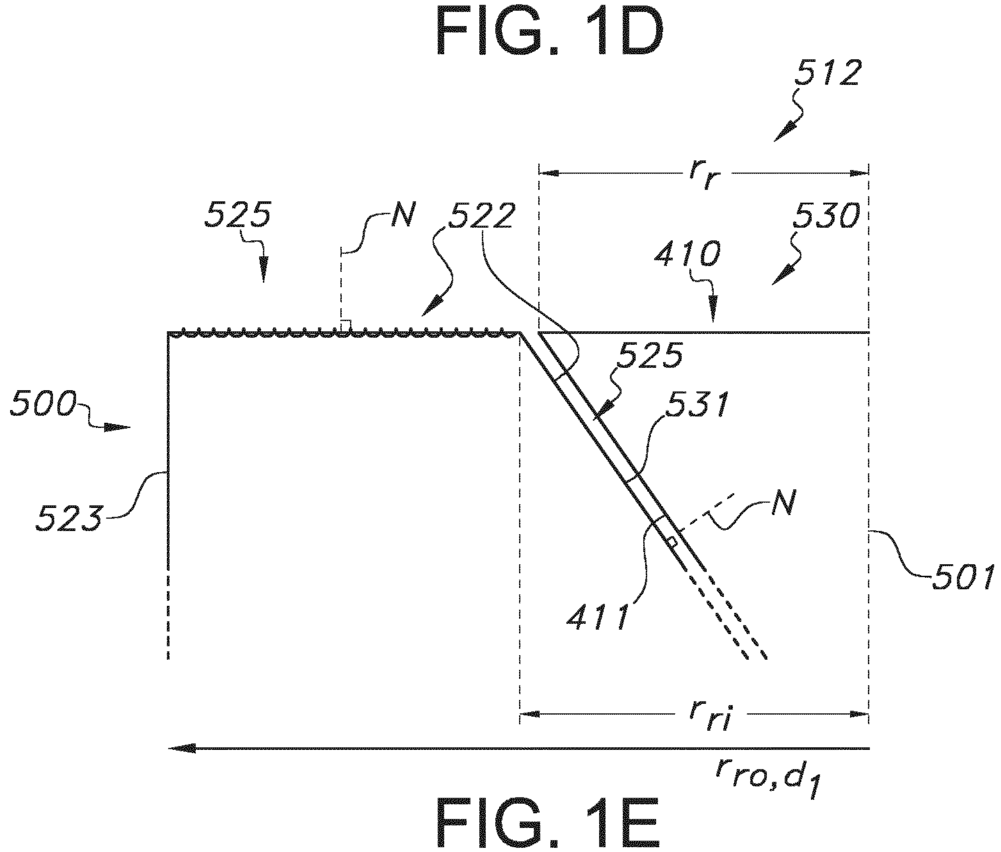

Amongst others referring to FIG. 1E, in embodiments, the at least part of the second outer face 522 may have a surface roughness for facilitating outcoupling of the device light 101 from the light transmissive body 510 via the second outer face 522. In embodiments, the surface roughness may have an Ra value selected from the range of 2.03-6.30 μm, more especially 3.15-5.10 μm, and/or an RMS value selected from the range of 98.90-306.20, more especially 153.7-248.6.

Referring to amongst others FIG. 1E, the rim part 525 may circumferentially surround the reflector 410. In embodiments, the reflector 410 may have a reflector radius $r_r$. The reflector radius $r_r$ may be smaller than the (radial) distance d1. For instance, in embodiments $r_r \leq 0.99*d1$. In specific embodiments, $0.8*d1 \leq r_r \leq 0.99*d1$, more especially $0.85*d1 \leq r_r \leq 0.99*d1$, like even more especially $0.9*d1 \leq r_r \leq 0.98*d1$, such as $0.95*d1 \leq r_r \leq 0.98*d1$. In embodiments, the rim part 525 may have an outer radius $r_{ro}$ essentially the same as the distance (d1). In embodiments, $r_{ro}=d1$. Further, in embodiments the rim part 525 may have an inner radius $r_{ri}$. In specific embodiments, the inner radius $r_{ri}$ of the rim part may essentially be the same as the outer radius of the reflector. Hence, in embodiments $r_{ri} \approx r_r$. In embodiments, $0.9 \leq r_r/r_{ri} 1.0$, more especially $0.95 \leq r_r/r_{ri} 1.0$, like in embodiments about $0.98 \leq r_r/r_{ri} \leq 1.0$. Therefore, in specific embodiments about $0.8*d1 \leq r_{ri} \leq 0.99*d1$, more especially about $0.85*d1 \leq r_{ri} \leq 0.99*d1$, like even more especially about $0.9*d1 \leq r_{ri} \leq 0.98*d1$, such as about $0.95*d1 \leq r_{ri} \leq 0.98*d1$. Such dimensions of the rim part may provide that at least part of the device light may propagate essentially parallel to the axis of elongation. The small dimensions and/or the surface roughness of the rim part may reduce or even prevent direct sight (through the lightguide element) of the one or more light generating devices upstream of the first outer face.

Figure 1F:
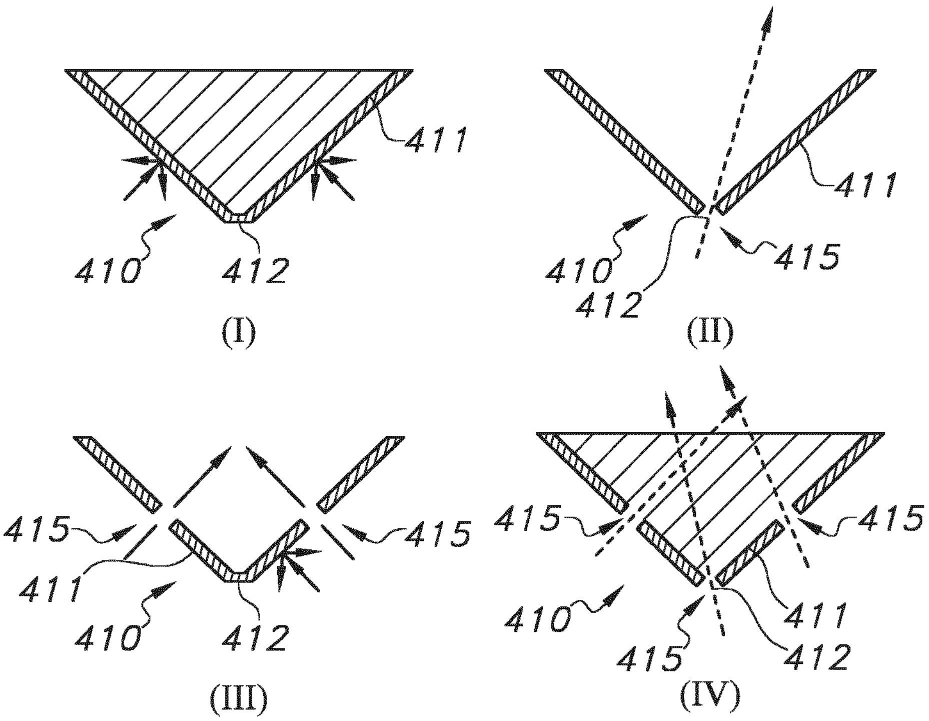
Figure 1G:
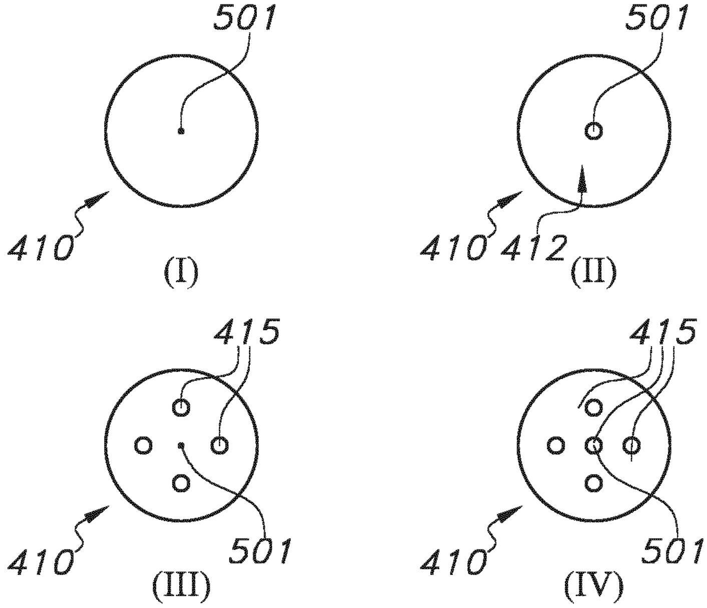

Amongst others referring to FIGS. 1D, 1F, and 1G, in embodiments, for 3-33% of a surface area of the second outer face 522 may apply that a normal to the second outer face 522 does not intersect with a reflector face of the reflector 410. In FIGS. 1B and 1E, the some of the dashed lines indicate normals N. The small rectangles at the bottoms of the normals N indicated the 90° aspect of the normals N relative to the surface to which the normals N are positions.

Figure 1H:
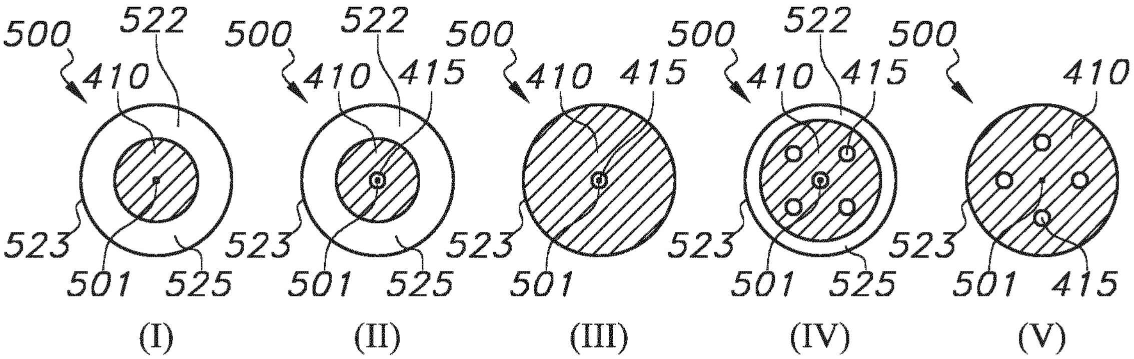

Referring to FIGS. 1F-1G, in specific embodiments, the reflector 410 may comprise one or more through holes 415. In FIG. 1F, embodiments I and IV comprise a solid light transmissive body with reflector 412, e.g. like a coating. In embodiments, I, the body even does not need to be light transmissive, as there is no through hole 415 in the reflector, like in embodiment IV. In embodiments II and III, hollow reflectors are schematically depicted. The hollow reflectors are schematically depicted to comprise one or more through holes 415. In embodiment II, the reflector may comprise a single through hole (intersected by the axis of elongation 501). Note that the reflectors 410 do not need to have a through hole. In such embodiments the lightguide element may especially comprise a rim part. FIG. 1G schematically depicts bottom views of the reflectors schematically depicted in FIG. 1F. FIG. 1H schematically depict some top vies of the lightguide element 500 with the reflector 410 configured in the cavity, with embodiments I, II, and IV having a rim part 525, and embodiments III and V not having a rim part. Further, embodiments II, III, IV, and V all have one or more through holes 415 in the reflector. Hence, in none of these embodiments the second outer face 522 is fully blocked by the reflector 410, and part of the device light may escape from the lightguide element 500 parallel to the axis of elongation. Hence, in embodiments one or more of the following may apply: (i) the reflector 410 comprises one or more through holes 415, and (ii) the second outer face 522 comprises a rim part 525 configured between the external side face 523 and the cavity 530.

Referring to amongst others FIGS. 1A-1B, 1D-1E, in embodiments, the second outer face 522 may comprise a rim part 525 configured between the external side face 523 and the cavity 530. In yet further specific embodiments, the rim part 525 may have the surface roughness may have an Ra value selected from the range of 2.03-6.30 μm, more especially 3.15-5.10 μm, and/or an RMS value selected from the range of 98.90-306.20, more especially 153.7-248.6.

Hence, the lightguide element 500 may essentially completely transparent, except for the external side face 523 which may have a surface roughness, which makes the surface opaque, and except for at least part of the second outer face 522, especially the rim 525, which may also have a surface roughness, which makes this surface also opaque. In embodiments, the reflector 410 may be configured to reflect part of the device light 101 propagated to the second outer face part 524 back into the lightguide element 500 (via the second outer face part 524).

In embodiments, the one or more light generating devices 100 may comprise one or more of a light emitting diode, a diode laser, and a superluminescent diode.

Referring to e.g. FIGS. 1C-1D, in embodiments, the light transmissive body 510 has a cylindrical shape. Especially, in embodiments the (radial) distance d1 may be selected from the range of 6-10 mm. In FIG. 1C (top view), the external side face 523 comprises a repetitive structure. In FIG. 1D, by way of example this repetitive structure is not available. In both embodiments, the external side face 523 may have the herein described surface roughness.

Further, in embodiments the reflector 410 may have a conical shape with a cone tip 412 directing to the first end 511. In embodiments, the reflector 410 may have a cone angle $\alpha$ selected from the range of 55-85°.

In embodiments, the cavity 530 has a reflector 410 directed cavity face 531, wherein at least part of the cavity face 531 may be not in optical contact with the reflector 410. In embodiments, the reflector 410 may have a light transmissive body directed reflector face 411.

Referring to FIG. 1A, most of the light 101 may leave the lightguide through surface 523, partly due to surface roughness of the sides. However a substantial part of the light 101 will be reflected by TIR at surface 524 and then leave the lightguide through surface 523. Also a substantial part of the light 101 will go through surface 524 and reflected back via reflector 410 back into the lightguide element; most of this light may leave the lightguide element also at surface 523.

Figure 1I:
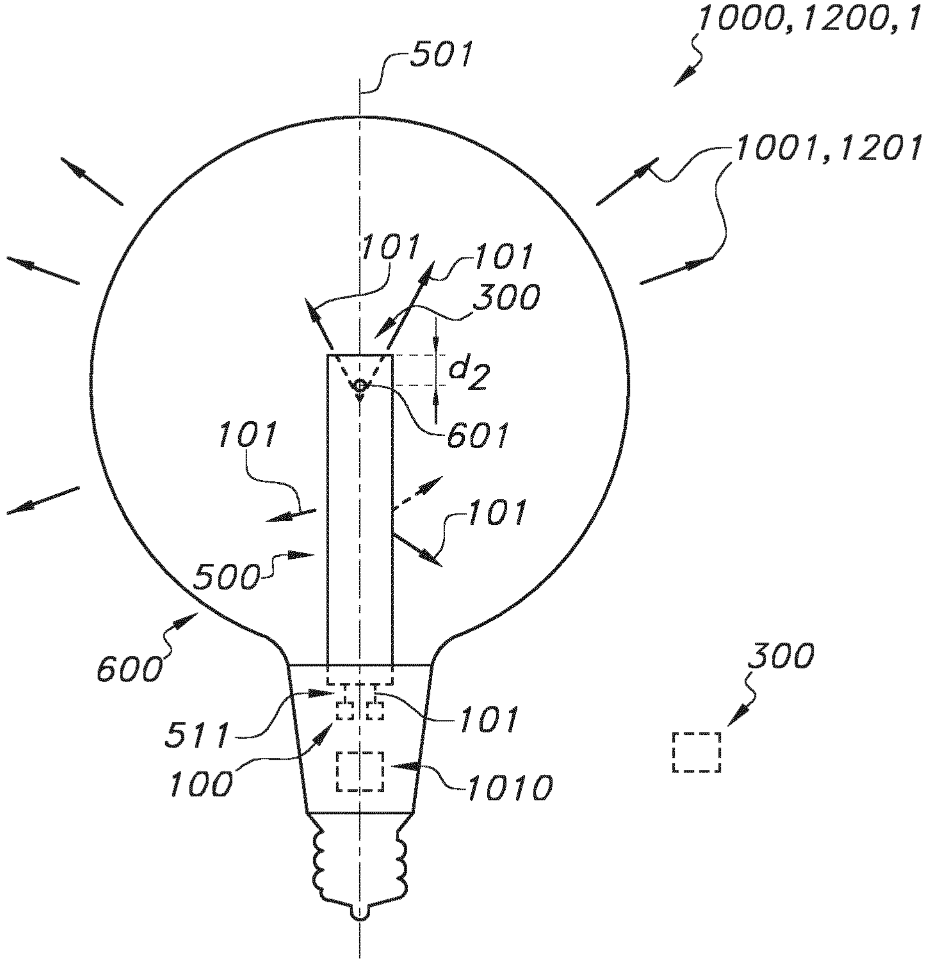

With reference to FIG. 1I, the system 1000 may further comprise a light transmissive envelope 600. Especially, at least part of the lightguide element 500 may be configured within the light transmissive envelope 600. Especially, the light transmissive envelope 600 may be transmissive for at least part of the device light 101. The outer shape of at least part of the light generating system may therefore essentially be defined by the lamp base and the envelope.

Light escaping from the system 1000 is indicated as system light 1001, and may comprise, more especially essentially consist, of the device light 101 (escaped from the lightguide element 500).

In embodiments, the light transmissive envelope 600 has an envelope center 601. Especially, in embodiments the second end 512 may be closer to the envelope center 601 than the first end 511. In specific embodiments, determined from the first end 511, a second distance d2 from the second end 512 to the envelope center 601 may be selected from the range of −10 mm to +15 mm.

The light generating system 1000 may further comprise a control system 300. The control system 300 may be configured to control a spectral power distribution of the device light 101.

In embodiments, the one or more light generating devices 100 comprise one or more of RGB light sources, RGBW light sources, and RYB light sources.

In specific embodiments, the light generating system 1000 may be configured to generate white system light 1001 comprising at least part of the device light 101 escaped from the lightguide element 500 via the external side face 523 and via the second outer face part 524. In further embodiments, the system light 1001 has one or more of a controllable color rendering index and a controllable correlated color temperature.

Figure 1J:
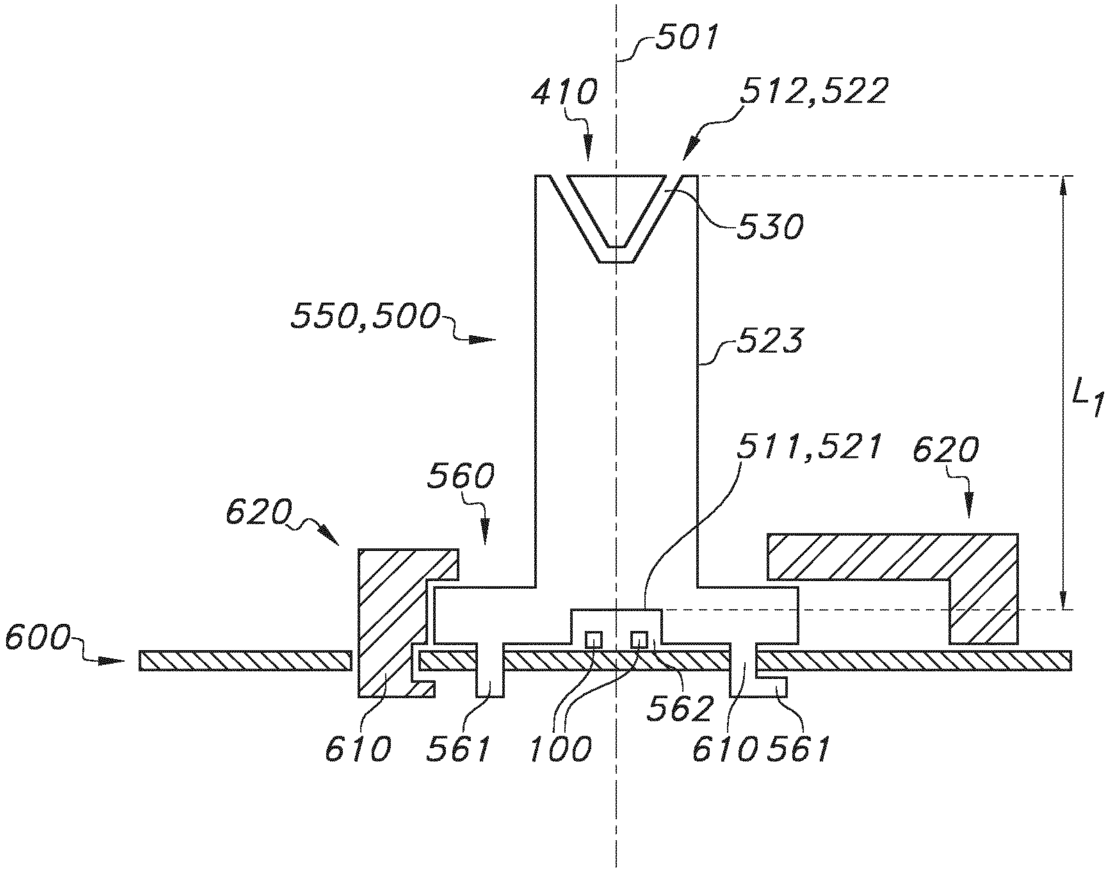

FIG. 1J schematically depicts an embodiment of a support 600, configured to support the one or more light generating devices 100. Further, an embodiment of a lightguide element assembly 550 is schematically depicted. In embodiments, the lightguide assembly 550 may comprise the lightguide element 500 and a lightguide element base 560 functionally coupled to the lightguide element 500. Especially, the lightguide element base 560 may comprise a base cavity 562, wherein the one or more light generating devices 100 are at least partly configured in the base cavity 562. The lightguide element 500 may be functionally coupled to the support 600 via the lightguide element base 560. Reference 610 refers to support holes. Reference 561 refers to a part of the assembly that may penetrate through the support 600. This may facilitate the functional coupling between the lightguide element base 560 and the support. The lightguide element base 560 may also be indicated as "lightguide element base". The base cavity may also be indicated as "foot cavity". Further elements may be provided to enable the functional coupling. Reference 620 refers to fastening elements, which may associated the lightguide element 500 to the support 600 (via the lightguide element base 560), for instance clamping elements.

Figure 2:
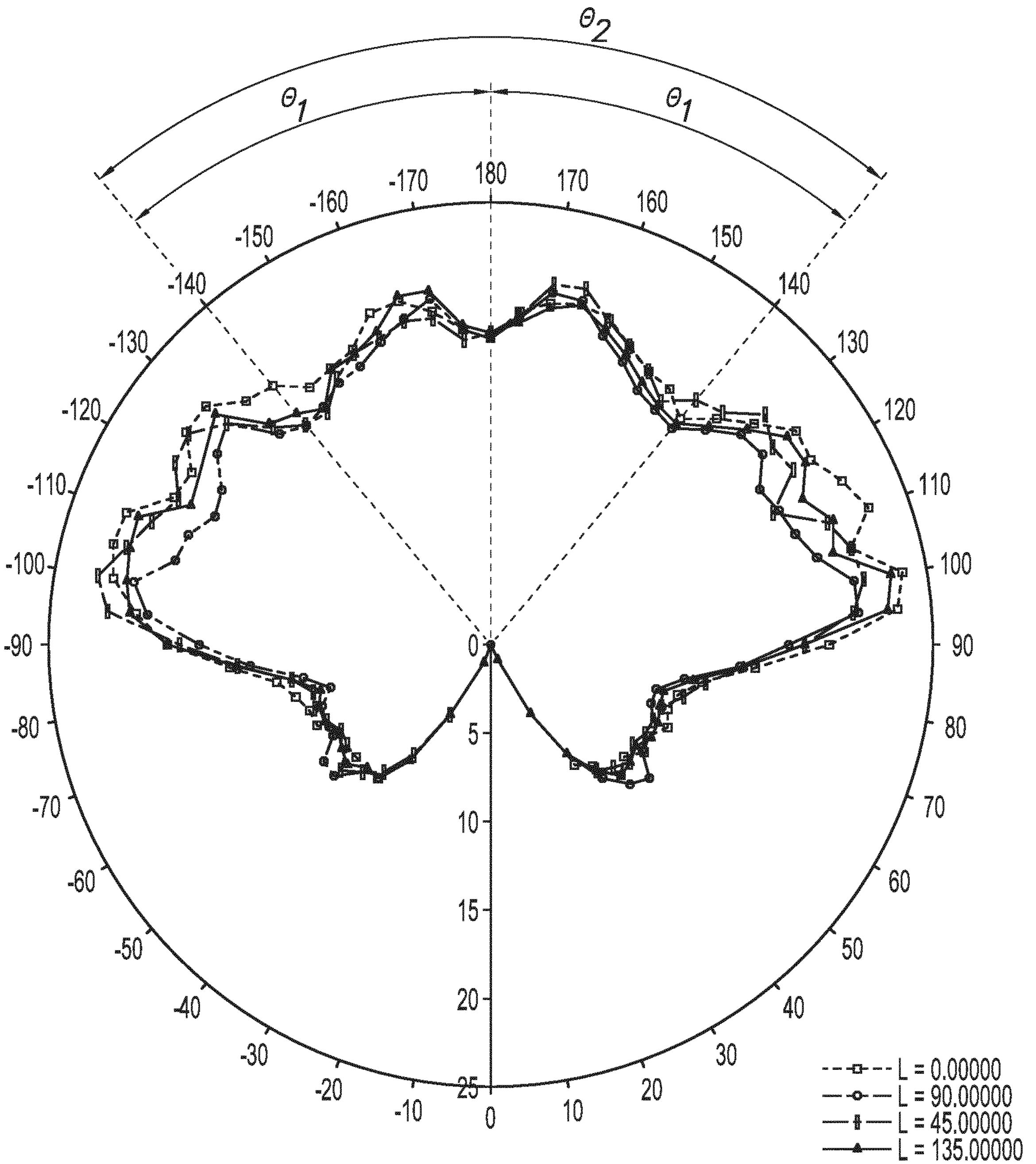
FIG. 2 shows the stimulated light distribution of an embodiment of the system.

FIG. 2 shows the stimulated light distribution of an embodiment of the system. As depicted, the distribution may be substantially Lambertian.

In an example, the lightguide element may have a length L1 of about 60 mm and a diameter of about 17 mm. The diameter of reflector is about 15. The reflector has a conical shape with a top angle or cone angle of about 72°.

Figure 3:
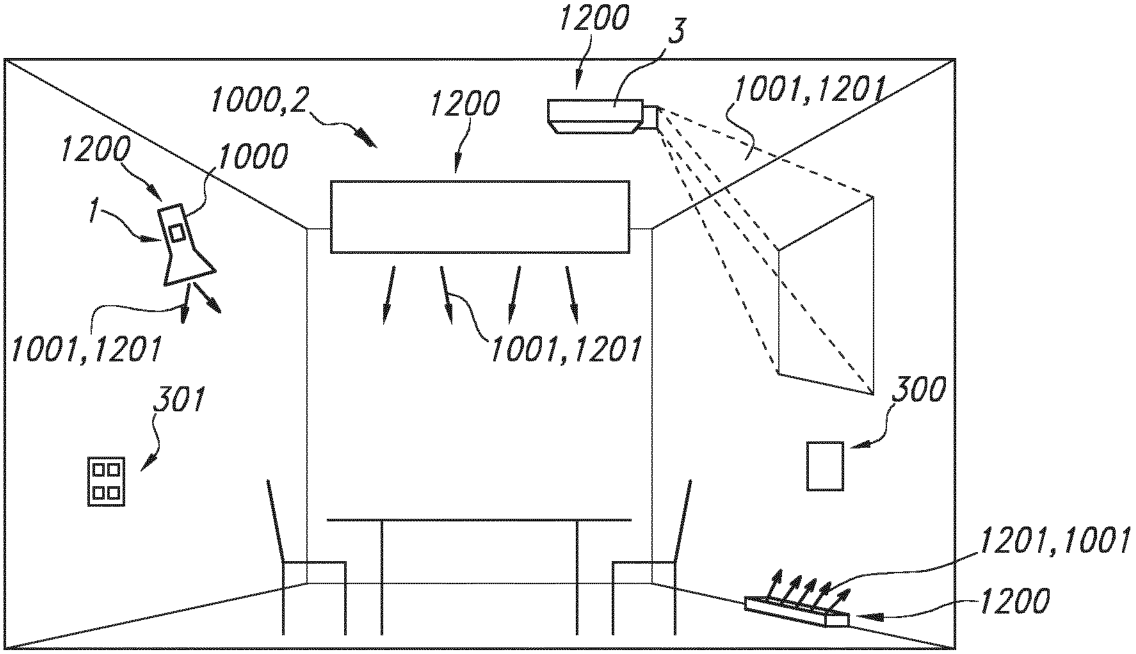
FIG. 3 schematically depict some further embodiments and aspects.

FIG. 3 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of lamp 1 comprising the light generating system 1000. Reference 3 indicates a projector device or projector system, which may be used to project images, such as at a wall, which may also comprise the light generating system 1000. Hence, FIG. 3 schematically depicts embodiments of a lighting device 1200 selected from the group of a lamp 1, a luminaire 2, a projector device 3, a disinfection device, a photochemical reactor, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising one or more light generating devices, a lightguide element, a reflector, and a light transmissive envelope, wherein:

the one or more light generating devices are configured to generate device light; wherein the one or more light generating devices comprise diode based light sources;

the lightguide element comprises a light transmissive body comprising light transmissive material, which is light transmissive for the device light; wherein the light transmissive body comprises an axis of elongation and a body length defined parallel to the axis of elongation, wherein the light transmissive body comprises a first end and a second end defining the body length; wherein the light transmissive body comprises (i) a first outer face, comprised by the first end, (ii) a second outer face, comprised by the second end, and (iii) an external side face bridging a distance between the first outer face and the second outer face and having a distance to the axis of elongation; wherein $d1<L1$; wherein the first outer face, the second outer face, and the external side face define at least part of an external surface of the light transmissive body; wherein a second outer face part of the second outer face is configured to provide a cavity for hosting at least part of the reflector;

the reflector is a diffuse reflector for the device light, wherein at least part of the reflector is configured in at least part of the cavity;

the one or more light generating devices, the lightguide element, and the reflector are configured such that (i) at least part of the device light is incoupled in the lightguide element via the first outer face, (ii) at least part of the incoupled device light escapes from the lightguide element via the external side face and via the second outer face, (iii) at least part of the device light that propagated to the second outer face part is reflected by the reflector, (iv) for 3-33% of a surface area of the second outer face applies that a normal to the second outer face does not intersect with a reflector face of the reflector; and at least part of the lightguide element is configured within the light transmissive envelope, wherein the light transmissive envelope is transmissive for at least part of the device light; and wherein at least part of the second outer face has a surface roughness for facilitating outcoupling of the device light from the light transmissive body via the second outer face.

2. The light generating system according to claim 1, wherein the at least part of the external side face has a surface roughness for facilitating outcoupling of the device light from the light transmissive body via the external side face.

3. The light generating system according to claim 2, wherein the surface roughness has an Ra value selected from the range of 0.16-0.64 μm.

4. The light generating system according to claim 2, wherein at least part of the external side face comprises a repetitive shape, having a period and a distance between crest and trough individually selected from the range of 0.1-4 mm.

5. The light generating system according to claim 4, wherein an edge defined by the external side face and the second outer face comprises the repetitive shape, wherein the repetitive shape has a sinusoidal shape.

6. The light generating system according to claim 1, wherein the surface roughness of the at least part of the second outer face has an Ra value selected from the range of 2.03-6.30 μm.

7. The light generating system according to claim 1, wherein for 10-25% of the surface area of the second outer face applies that a normal to the second outer face does not intersect with the reflector face of the reflector; and in the range of 2-15% of the device light that escapes from the light generating system escapes within a cone with the axis of elongation as cone axis, wherein the cone has a cone angle selected from the range of 20-40°; wherein the reflector comprises one or more through holes.

8. The light generating system according to claim 1, wherein the second outer face comprises a rim part configured between the external side face and the cavity.

9. The light generating system according to claim 1, wherein the reflector is configured to reflect part of the device light propagated to the second outer face part back into the lightguide element; wherein the one or more light generating devices comprise one or more of a light emitting diode, a diode laser, and a superluminescent diode.

10. The light generating system according to claim 1, wherein the light transmissive body has a cylindrical shape; and wherein the distance is selected from the range of 6-10 mm; wherein the reflector has a conical shape with a cone tip directing to the first end; wherein the reflector has a cone angle selected from the range of 55-85°; and wherein 55-98% of all device light that escapes from the light generating system escapes from the lightguide element via the external side face, and 2-45% of all device light that escapes from the light generating system escapes from the lightguide element via the second outer face.

11. The light generating system according to claim 1, wherein the cavity has a reflector directed cavity face, wherein at least part of the cavity face is not in optical contact with the reflector.

12. The light generating system according to claim 1, comprising a support, wherein the support is configured to support the one or more light generating devices; wherein the light generating system further comprises a lightguide element assembly, wherein the lightguide assembly comprises the lightguide element and a lightguide element base functionally coupled to the lightguide element, wherein the lightguide element base comprises a base cavity, wherein the one or more light generating devices are at least partly configured in the base cavity, wherein the lightguide element is functionally coupled to the support via the lightguide element base.

13. The light generating system according to claim 1, wherein the light transmissive envelope has an envelope center, wherein the second end is closer to the envelope center than the first end, and wherein determined from the first end, a second distance from the second end to the envelope center is selected from the range of −10 mm to +15 mm.

14. The light generating system according to claim 1, further comprising a control system configured to control a spectral power distribution of the device light; wherein the one or more light generating devices comprise one or more of RGB light sources, RGBW light sources, and RYB light sources; wherein the light generating system is configured to generate white system light comprising at least part of the device light escaped from the lightguide element via the external side face and via the second outer face, wherein the system light has one or more of a controllable color rendering index and a controllable correlated color temperature.

15. A lighting device selected from the group of a lamp, a luminaire, a projector device, a disinfection device, a photochemical reactor, and an optical wireless communication device, comprising the light generating system according to claim 1.

* * * * *